US005117683A

United States Patent [19]

Phillips

[11] Patent Number: 5,117,683

[45] Date of Patent: Jun. 2, 1992

[54] METHOD OF MEASURING LEAKAGE IN FUEL INJECTOR SYSTEM

[75] Inventor: Claude F. Phillips, Fairfield, Ill.

[73] Assignee: UIS, Inc., New York, N.Y.

[21] Appl. No.: 668,763

[22] Filed: Mar. 13, 1991

Related U.S. Application Data

[62] Division of Ser. No. 475,917, Feb. 6, 1990, Pat. No. 5,022,364.

[51] Int. Cl.[5] .............. G01M 15/00

[52] U.S. Cl. .............. 73/119 A; 73/49.1

[58] Field of Search .............. 73/40, 40.5 R, 49.1, 73/119 A

[56] References Cited

U.S. PATENT DOCUMENTS

| | | | |
|---|---|---|---|
| 2,859,612 | 11/1958 | Morse | 73/40 |
| 3,756,072 | 9/1973 | MacMurray | 73/49.1 |
| 3,874,225 | 4/1975 | Fegel | 73/119 A |
| 4,103,537 | 8/1978 | Victor | 73/40.5 R |

FOREIGN PATENT DOCUMENTS

| | | | |
|---|---|---|---|
| 62-8033 | 1/1987 | Japan | 73/49.1 |

*Primary Examiner*—Noah P. Kamen
*Attorney, Agent, or Firm*—Albert M. Zalkind

[57] ABSTRACT

Method and apparatus for cleaning fuel injector systems of internal combustion engines which comprises avoidance of burns and possible injuries in setting up the conventional system apparatus in the engine compartment. The present method is characterized by setting up the required connections and apparatus at the rear of the vehicle in an area isolated from the region under the vehicle hood. The invention has other advantages. In particular, filter replacement in the isolated area subsequent to completion of the cleaning process is effected by a novel aspect of the method which involves filter removal as a step in the method. In a conventional method the filter is left in place but ultimately replaced, for comprehensive maintenance of the fuel system, as an additional step. Another advantage of the invention is the method of detecting leakage in injector and fuel flow systems and to detect the extent of clogging of individual injectors to determine the need for replacement.

1 Claim, 1 Drawing Sheet

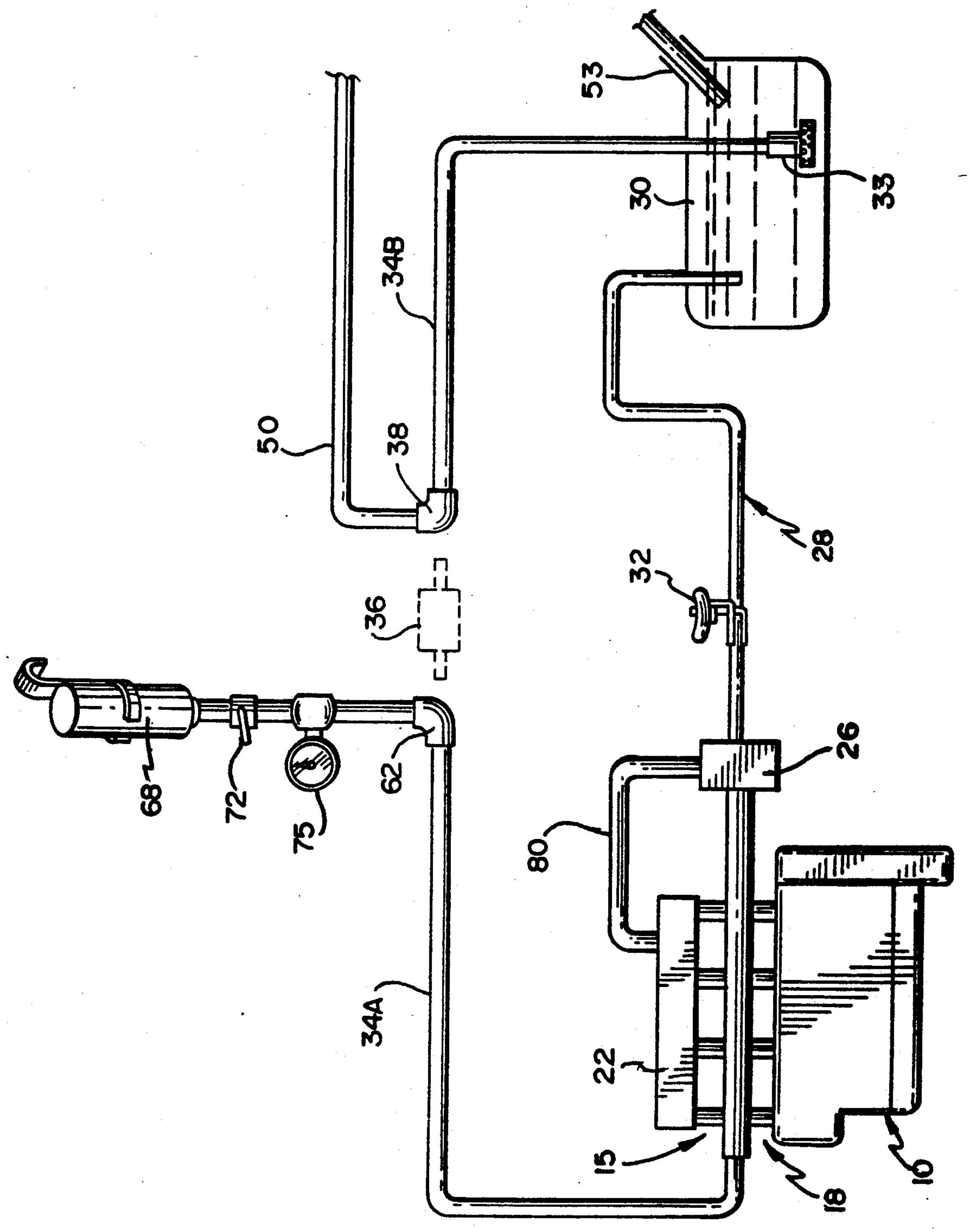
53
33
30
34B
50
38
28
32
36
26
80
68
72
75
62
34A
22
15
18
10

METHOD OF MEASURING LEAKAGE IN FUEL INJECTOR SYSTEM

This application is a division of application Ser. No. 07/475,917, filed Feb. 6, 1990, now U.S. Pat. No. 5,022,364.

BACKGROUND OF THE INVENTION

With the increasing adoption of fuel injector engines, there has arisen the need for cleaning the flow path of fuel injectors, and in particular, the fuel injector nozzles themselves.

Combustion projects, carbon-silicone deposits, clog the extremely small injector passages of injectors in the course of use.

The necessity of the cleaning process is due to the formation of clogging deposits which have harmful fuel feed effects. For example, such deposits can change the fuel spray pattern injected into the airstream enroute to a cylinder. This causes power loss, poor acceleration and surging, which is a condition that can cause accidents.

Other effects are rough idling and hesitation or sudden slowdown. Numerous other harmful effects are known.

For instance, certain harmful effects on the fuel intake system comprising valves and ports affect car performance and can cause parts damage.

Basically, such cleaning of a fuel injection system involves a combustible cleaning fluid which is pressure fed to the fuel injector system in substitution for the regular fuel supply. Thus, the engine runs on the cleaning fluid. Various channels and passages are then cleaned by a fuel mixture of air with the cleaning fluid.

To the best of my knowledge, all present commercial methods and apparatus for cleaning fuel injector systems usually have a mechanic attend the engine compartment during injector cleaning. This exposes the mechanic to contact with engine components having very high temperatures and also to injury due to rotating parts. Such exposure is risked, in the event the engine being in operation during the cleaning process, wherein throttle adjustment is needed to correct irregular running.

Although, standing at the engine for adjusting the throttle is optional with sitting in the vehicle, for adjustment to overcome tentative irregularity of the engine by gas pedal operation, actually the hood need not be lifted at all in the use of the present invention. All fuel line disconnects and connects are made under the car and the inevitable drips fall on the ground, not on the engine.

Further, the versatility of prior systems known to me is limited, in that they have utility only for vehicles where the hookup for the cleaning apparatus is under the hood.

Also, some vehicles have a single injector spraying into a common intake manifold for mixing with fuel spray.

With one exception, to the best of my knowledge, all conventional methods disable, i.e., disconnect the fuel pump during the cleaning process. This brings in a complication in locating a disabling point and possible damage to car components for access and to the pump connector plug which may fail to make a good contact on reconnection.

This single exception is where the fuel pump is kept running but the output shunted back to the fuel tank by connections made under the car hood.

However, no connections involve filter removal which requires a separate step with new replacement after the cleaning process instead of being part of the cleaning process.

Also, shunting the fuel pump output back to the fuel tank under the hood is done after the engine is heated to operating temperature. Therefore, the mechanic must risk burns from the engine in making the hook-up.

There are other disadvantages to conventional methods. For example, where fuel line disconnects and connects have to be made under car hood there is usually some fuel which drips on the warmed up engine. The engine being necessarily warmed to normal temperature at this time, prior to the cleaning process, such drips can be dangerous and could start a fire. Also, fuel can drip onto painted surfaces, such as fenders of a vehicle and cause damage.

BRIEF DESCRIPTION OF THE PRESENT INVENTION

The present invention overcomes drawbacks of conventional methods of cleaning fuel injectors by doing the work required for hooking up the cleaning system at the rear of the car in an isolated area free from the dangers of the engine compartment.

Most vehicles have a fuel filter in an isolated area at the rear or towards the center and under the vehicle where fuel is filtered to the fuel injector system of the engine. An air-fuel mixture passes directly to respective cylinders each having an intake valve for feeding the cylinders. The heat that surrounds the injectors is instrumental in causing corrosion buildup on the injector tips.

However, some vehicles have a single injector spraying into an air manifold feeding to intake valves.

In the method of the invention, after the engine warm-up to operating temperature, communication from the fuel injector system return line to the tank is clamped off. The fuel filter in the isolated area toward the rear or car middle, away from the engine, is then removed and a special fuel return line has an end connected to the connector which had previously been connected to the upstream end of the removed filter. The other end of this fuel return line is then inserted into the tank filler neck with suitable stuffing therearound to prevent backflow and vapors from the tank. Such fuel return line effects a shunt from the fuel pump which is kept operating, the output being shunted back to the tank.

A container of pressurized cleaner is secured in the isolated area and has a feed line that connects to the connector that had previously been connected with the downstream end of the removed filter. The cleaning fluid which can be conventionally formulated for the purpose passes directly to the fuel injector system via the vehicle's existing fuel feed line. Such fluid operates the engine as a substitute for the existing fuel system. It should be noted that the method of the invention is operable for either the multi-port injector system in which each cylinder has a respective injector or the single port injection system which uses a single injector spraying into the air intake manifold for all cylinders.

It should further be noted that in a conventional cleaning system if the fuel pump is disabled, i.e., disconnected from the associated circuitry it can affect the computers that control car operation, causing restart and running problems.

When one considers the complexity of components under the hood which can occasion difficult access to the fuel injector rail of the injector system, the method of hook-up in the relatively simple layout of components in which the present invention is operative becomes evident.

The invention is primarily intended for the majority of vehicles in use in the United States. Such majority uses fuel injection having the fuel filters in the area under the car isolated from the heat of the engine and moving parts. There are vehicles which have the fuel filter under the hood and there are also cars which still use carburetors although their numbers are declining. The invention with the basic apparatus for fuel connections to be made at the connectors to the removed filter under the car and the shunt from the operating fuel pump to the tank filler neck is adaptable to all under the hood filter cars and carburetor cars as a matter of selection of components for connections.

A detailed description of the invention now follows in conjunction with the appended drawing showing a pictorial diagram hookup of the elements of the invention for cleaning an injector system when the fuel filter is located at the rear under a vehicle in an area isolated from the engine.

In the drawing the arrows show the directions of flow during an injection cleaning operation.

Two areas of a vehicle are shown, separated by an undulated line, and designated ENGINE SPACE UNDER HOOD and ISOLATED AREA AT REAR. These terms designate conventional car construction, it being understood that the isolated area is accessible beneath the car by putting the car on a lift, on elevated rails, or on rear wheel stands.

The hookup can also be accomplished by a mechanic on a creeper.

The engine space contains the engine 10, injector system 15, with fuel rail 18 which distributes fuel to the injectors, air intake manifold 22 and fuel pressure regulator 26 downstream of the fuel rail.

A fuel return line 28 connects from the pressure regulator to a fuel tank 30 during normal vehicle operation but is closed by a clamp 32 during the cleaning operation. This is conventional practice so that cleaning fluid will not flow to the fuel tank. Output from fuel pump 33 passes through a fuel feed line shown in two sections 34A and 34B separated by removal of the fuel filter designated as 36 and represented by dashed lines.

Removal of the fuel filter makes it possible for the upstream filter connector 38 from the fuel pump to connect to a fuel bypass or shunt line 50 which during the injector cleaning operation shunts the pump output back to the fuel tank. This can be readily effected by inserting the downstream end of the shunt line into the filler neck 53 of the fuel tank using any handy packing such as a shop towel for stuffing to block vapors or fuel leakage out of the filter neck.

The downstream filter connector line 62 is connected to a cleaner feed line 65 from a pressurized source of cleaner fluid such as a can 68. As illustrated the can 68 has a hook holder so as to be suspended from any convenient component such as brake cables, fuel lines, brake lines, axle brackets, etc. The cleaner fluid feed line 65 feeds through a shutoff valve 72 and sequentially through a manual operable pressure regulator 75 having a gage as shown.

From the preceding description it will be apparent that due to the hookup method of the invention in the isolated area there is no need to risk burns by exposure to the heated engine under the hoods for shunt connection albeit the heated engine is not in operation at the time of under the hood hookup.

Alternatively, to clamping the fuel return line especially on low pressure systems where running pressure is close to the cleaning pressure it may be a matter of mechanic's choice to disconnect the vacuum hose 80 from the intake manifold to the return line pressure regulator. This makes regulation of cleaning fluid pressure less sensitive. Generally, the cleaning pressure is 3-5 psi less than the running pressure.

However, clamping the return line provides faster cleaning adjustment and makes for more complete burning of cleaning fluid which cannot then go back to the tank.

In a cleaning hook up the cleaning fluid adjustable pressure regulator is set so that the gage reads the required cleaning fluid pressure for a particular vehicle.

However, there may be some leakage in the system. Although the gage will still read the required pressure.

In the particular method described below, for fuel system cleaning or leak testing, the pressure used is set a few pounds below the vehicle running pressure, i.e., below the pressure that can open the return line regulator. Usually a mechanic can refer to a manual for a reduced pressure.

The method herein eliminates the need and expense of an extra gage by providing a cleaning fluid shut off valve 72 upstream of the pressure regulator 75.

Thus, after first setting the required pressure on the gage by means of pressure regulator 75, the pressure is then reduced 3-5 PSI less than the required pressure, without clamping off return line 28. The system can be stabilized by permitting cleaning fluid flow 3-5 seconds after which shut off valve 72 cuts off flow. This locks in the initially set pressure in the system. Then return line 28 is clamped.

If there is no leakage after a few minutes of opening up the shut off valve, the original gage reading should be the same. If there has been leakage the gage reading will be lower.

The pressure reduction minimizes the amount of cleaning fluid to go into the fuel tank to mix insignificantly with the gasoline.

The above description of shutting off for leakage testing is generalized, but by way of explanation the stabilization is effected by leaving the return line open for a few seconds until the gage reading is steady.

Then the return line is closed off as by a clamp, only a very small quantity of cleaning fluid going into the fuel tank. It should be noted that in the applicant's method pressurizing the system for leakage tests is effected by the pressurized source and does not require the complications involved in a conventional system which uses pump fuel pressure for that purpose.

In any event, whether the leak test be by a conventional hook up or by the applicant's method it can be done with a cold engine, the applicant's method not only is simpler in hook up but avoids the needless expense of an extra gage.

Should leakage or injector clogging be found the better practice is to locate and repair such problems before proceeding with the cleaning process. Leakage not repaired will cause irregular running and problems despite the cleaning process after operation of the vehicle is subsequently restored. This is especially true if the leakage happens to be in the injectors themselves.

The convenience and economy effected by the applicant's invention is apparent. The addition of the shut off valve makes proper procedure a matter of merely closing the shut off valve to detect leakage to be repaired as a matter of good maintenance practice. This is in contrast with conventional equipment that requires an additional gage.

In general, a lower pressure than the regular vehicle running pressure of gasoline is usable for the cleaning process, or the leak test, since that pressure need not be as high as the vehicle running pressure.

The vehicle would not be under load and no running pressure is needed, particularly since the engine is not running; all leakage would show up by lower gage pressure.

This method which involved stabilizing the cleaning fluid flow is only when the mechanic is not familiar with that particular type of car and has no manual for guidance.

As a matter of convenience for experienced mechanics the full running pressure can be used provided the return line is first clamped off to prevent any cleaning fluid from getting into the tank to dilute the gasoline. If the return line is inadvertently not clamped off the cleaning fluid under pressure will fully discharge into the tank in a matter of seconds with unacceptable dilution. In that case, the tank should then be filled to capacity with gasoline to prevent damage to the electric fuel pump. If concentration of cleaning fluid is too great in the tank, it could dissolve varnish from the pump windings since the cleaning fluid attacks varnished surfaces.

Some cars have metal return lines from the car's regulator to the fuel tank. In such case, since the engine must be at operating temperature when the pressurized cleaning fluid flows to the injector and fuel systems, it is not possible to clamp the return line in the isolated area. However, the return flow from the car's pressure regulator must be stopped during cleaning. This is done by removing and plugging the vacuum line under the hood from the intake manifold. So doing closes flow through the pressure regulator to the tank.

However, in cars where the return line cannot be clamped, the leak detection test can be carried out with the engine cold. Accordingly, the shut-off valve provides the same advantage. With use of the above procedure for preventing flow of the testing fluid to the tank, such advantage being as heretofore described inasmuch as work under the hood of a cold engine involves no burn risk.

Regarding cleaning fluids, there are several available which are satisfactory but applicant's preference is for that manufactured by Aersol Systems, Inc., identified by the manufacturer as Aerosol Systems #TM-3381.

I claim:

1. A method of measuring leakage in the injector and fuel flow systems of an internal combustion engine having a fuel return line downstream of the injector system; which comprises:

establishing by gage measurement the normal operating fuel pressure of liquid flow from a pressurized source to said fuel injector system;

adjusting the pressure to less than fuel return line regulator opening pressure;

permitting flow to pass therefrom through said fuel return line to stabilize flow from the pressure source until the gage has steady reading;

preventing further flow through said fuel return line;

shutting off flow between said pressurized source and said gage whereby pressure is held in said injector and fuel systems measured by said gage;

and observing any drop in gage pressure after an interval of time to detect leakage.

* * * * *